United States Patent [19]

Mukaemachi et al.

[11] Patent Number: 4,663,759
[45] Date of Patent: May 5, 1987

[54] RING BACK TONE TRANSMISSION SYSTEM

[75] Inventors: Takuji Mukaemachi; Hirotoshi Shirasu, both of Yokohama; Taihei Suzuki, Kodaira, all of Japan

[73] Assignee: Hitachi, Ltd., Tokyo, Japan

[21] Appl. No.: 726,650

[22] Filed: Apr. 24, 1985

[30] Foreign Application Priority Data

Apr. 25, 1984 [JP] Japan ................... 59-81747

[51] Int. Cl.$^4$ .................. H04J 3/12; H04Q 11/04
[52] U.S. Cl. .................................... 370/110.2; 370/65
[58] Field of Search ............ 370/65, 110.1, 110.2, 370/58, 15; 179/84 VF, 84 SS

[56] References Cited

U.S. PATENT DOCUMENTS

| | | | |
|---|---|---|---|
| 3,899,642 | 8/1975 | Jones et al. | 370/110.2 |
| 4,110,562 | 8/1978 | Moed | 370/110.2 |
| 4,172,214 | 10/1979 | McDonald et al. | 370/65 |
| 4,480,330 | 10/1984 | Magnusson et al. | 370/110.2 |

*Primary Examiner*—Douglas W. Olms
*Assistant Examiner*—Wellington Chin
*Attorney, Agent, or Firm*—Antonelli, Terry & Wands

[57] ABSTRACT

In a digital and electronic switching apparatus, each subscriber's circuit is provided with a loop back circuit which selectively return a downward channel signal to an upward channel in order that a ring back tone informing a calling telephone set of the fact that a called telephone set is being dialed can be synchronized with a ringing tone dialing a called telephone set. Upon dialing a called subscriber, the loop back circuit is ON-OFF controlled in synchronism with the ON-OFF control of the ringing tone so that a tone signal generated from a common continuous ring back tone source can be transmitted to the loop back circuit and the calling telephone set via a speech path of a switching network.

12 Claims, 3 Drawing Figures

RING BACK TONE TRANSMISSION SYSTEM

BACKGROUND OF THE INVENTION

1. Field of the Invention

This invention relates to a ring back tone transmission system and more particularly to a ring back tone transmission system of a digital and electronic switching apparatus which transmits a ring back tone informing a calling subscriber of the fact that a called subscriber is now receiving a ringing signal.

2. Description of Prior Art

In a conventional digital switching apparatus, a speech path system is constituted by digital circuits and therefore, it is necessary to provide for each telephone set a subscriber circuit serving a subscriber line interface which handles necessary high voltage signals and analog signals. Accordingly, reduction in size and inexpensive construction of each subscriber's circuit are of matter of importance. For circuit simplification, a continuous ringing signal source producing a ringing signal which drives the telephone bell of a called subscriber set is constructed as a part of a subscriber's circuit and is ON-OFF controlled by a switch, also provided in the subscriber's circuit, for a transmission time and at a period in compliance with intended purpose and application. This leads to difficulties in obtaining synchronization of a ringing signal with a ring back tone, i.e. a signal informing a calling subscriber of the transmission of the ringing signal, although the synchronization has been easy to achieve in a conventional electromagnetic type switching apparatus.

More particularly, in the digital switching apparatus, a plurality of subscriber's circuits are coupled to a digital switching network for connection exchange via digital signal transmission lines, and a ring back tone source is also constituted by a digital circuit.

When a calling subscriber goes off-hook for dialing, a central processing device for controlling the exchange operations carries out a well-known series of operations, including a switching exchange operation, receiving a dial signal, numerical analysis and discrimination of the stored position of the called subscriber. If a called subscriber is idle, then a speech path after acknowledgement by the called subscriber will be selected and pre-blocked. Subsequently, a ringing signal is transmitted to the telephone set of the called subscriber. For the transmission of a ringing signal, the central processing device instructs a terminal processor for controlling the plurality of subscriber's circuits to activate the transmission of a ringing signal. The terminal processor thus instructed ON-OFF controls a switch provided in a subscriber line for a predetermined ringing time at a predetermined period, so that a ringing signal is supplied to the telephone set of the called subscriber.

On the other hand, the central processing device operates to couple a ring back tone source to a calling subscriber's circuit via the switching network in order to provide a ring back tone to a telephone set of the calling subscriber.

The terminal processor is designed so as to control a plurality of subscriber's circuits in common. Therefore, in order to synchronize the timing signal for controlling the application of ringing signal to the called subscriber telephone set with the phase of the ring back tone, it is necessary to provide a device for distributing the phase information of the ring back tone source to ringing signal controllers of the plurality of subscriber's circuits. In addition, in order to control the ringing signal of the called subscriber's circuit in compliance with the phase information, there results an overload on capability of the terminal processor per se and when a plurality of called subscriber telephone sets simultaneously transmit ring back tones, a problem is raised wherein capacity of the ring back tone source and drive power therefor are increased. For these reasons, the synchronization of the ring back tone with the ringing signal becomes costly and conventionally, the ringing signal is made asynchronous with the ring back tone at the cost of convenience.

Moreover, the central processing device must communicate with the calling subscriber terminal processor to exchange an instruction for transmission of the ring back tone and an instruction for deactivation of the ring back tone upon acknowledgement by the called subscriber and its processing capability is overloaded.

Under the circumstances, users accustomed to handle the electromagnetic type switching apparatus in which a synchronized ring back tone and ringing signal are provided are unsatisfied with the existing digital and electronic switching apparatus, and the advent of a digital and electronic switching apparatus having an improved ring back tone transmission has been desired.

SUMMARY OF THE INVENTION

An object of the present invention is to provide an inexpensive ring back tone transmission system for a digital and electronic switching apparatus which is capable of reducing the load on the central processing device and transmitting a ring back tone which is synchronous with the ringing signal.

To accomplish the above object, according to the invention, each subscriber's circuit in a digital and electronic switching apparatus has a loop back circuit for returning a downward channel signal (a channel signal transmitted from the switching network to a telephone set) to a desired upward signal channel (a channel signal transmitted from a telephone set to the switching network), a switch operative to transmit a ringing signal to a called subscriber in compliance with a predetermined pattern, and a control circuit for controlling the loop back circuit and the switch. Upon dialing a called subscriber, a speech path is established between a calling subscriber's circuit and a called subscriber's circuit, a ring back tone source producing a continuous tone signal is coupled to a downward signal input part of the called subscriber's circuit, and under the control of the control circuit of the called subscriber's circuit, the tone signal generated from the ring back tone source is transmitted as a ring back tone to the calling subscriber's circuit via the loop back circuit and the speech path.

DESCRIPTION OF THE PREFERRED EMBODIMENTS

Figure 1:
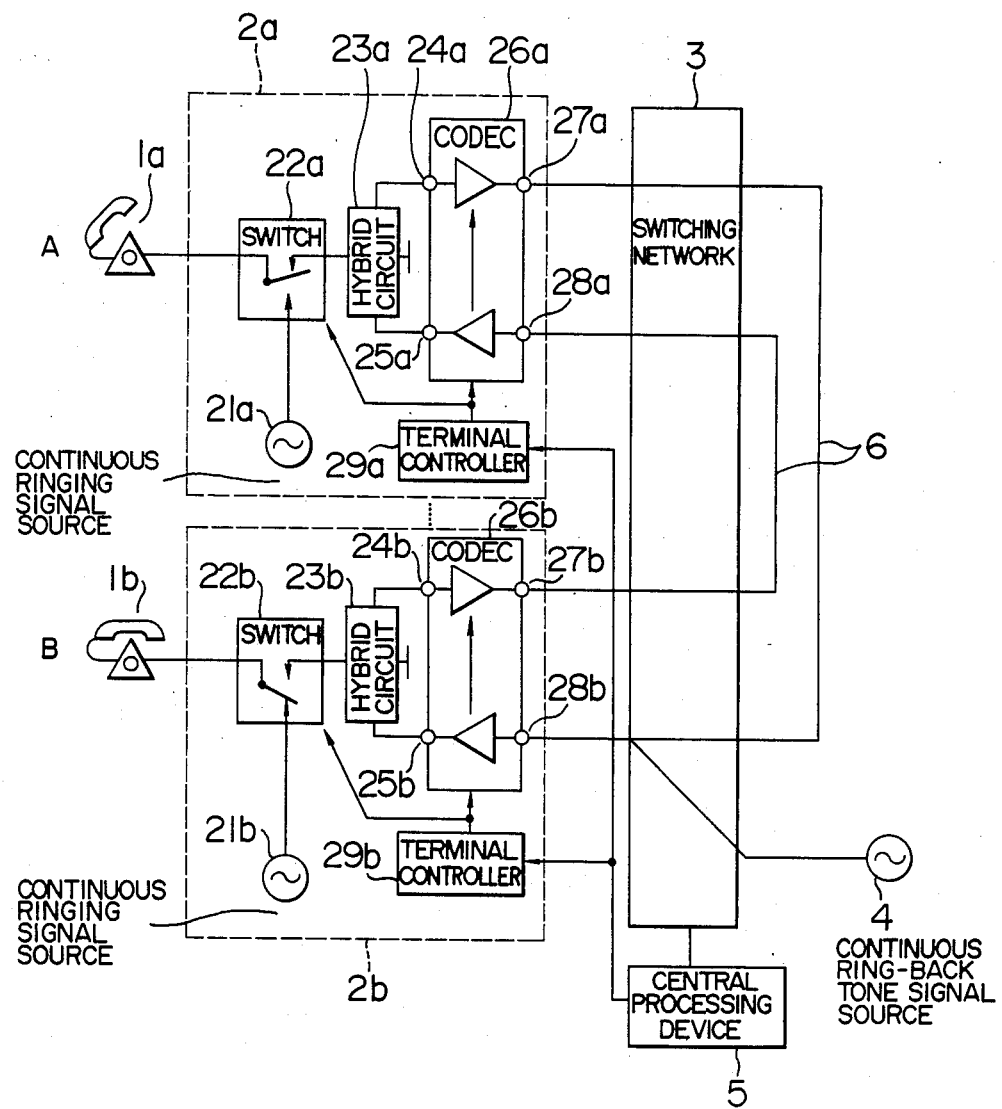
FIG. 1 is a partial schematic of a digital and electronic switching apparatus incorporating a ring back tone transmission system embodying the invention.

The present invention will now be described by way of example. FIG. 1 shows a schematic construction of a digital switching apparatus having a ring back tone transmission system according to the invention.

Referring to FIG. 1, there are seen a telephone set 1a of a subscriber A and a telephone set 1b of a subscriber B, subscriber's circuits 2a and 2b, a digital switching network 3, a signal source for providing ring back tone 4 for producing a continuous tone signal at a predetermined frequency, a central processing device 5 for controlling the switching operations, and speech paths 6. The subscriber's circuit 2a comprises a source 21a of a ringing signal, a switch 22a for controlling the transmission of a ringing signal to the telephone set 1a, a hybrid circuit 23a, a CODEC 26a which modulates a voice signal applied to an input terminal 24a into a digital signal of a PCM code so as to transmit the digital signal serving as an upward signal to a channel via an output terminal 27a and which demodulates a digital signal of a PCM code serving as a downward signal and received via an input terminal 28a so as to produce a voice signal on an output terminal 25a, and a terminal controller 29a for controlling the operation of the subscriber's circuit 2a. The subscriber's circuit 2b has constituent components quite similar to the circuit 2a. It should be noted that in FIG. 1, the digital and electronic switching apparatus is illustrated only with respect to those components directly related to the present invention for simplicity of explanation, but has additional components (not shown) identical to those typically provided in a well known digital and electronic switching apparatus. Further, the switching apparatus exemplified in FIG. 1 as having only two subscriber's circuits in practice obviously has a great number of subscriber's circuits. Furthermore, the terminal controllers 29a and 29b dedicated to the respective subscriber's circuits in the illustrative example of FIG. 1 may be replaced with a single terminal controller adapted to control a plurality of subscriber's circuits.

The operation of the switching apparatus will now be described. When the subscriber A goes off-hook for dialing, the central processing device 5 carries out a well known series of operations including call processing, receiving dialing signals, numerical analysis and discriminating the stored position of the called subscriber. Thus, the central processing device 5 is constructed and operated exactly in the same manner as a well known central processing device.

If the telephone set 1b of the called subscriber B is idle, then the central processing device 5 will designate time slots in one channel of the highway (bus) to ensure that the ring back tone source 4 can be coupled via the switching network 3 to the downward signal input terminal 28b of the called subscriber's circuit 2b and will inform the terminal controller 29b of the thus designated time slot numbers. In addition, the central processing device 5 sets a speech path 6 between the calling subscriber A and the called subscriber B. In setting the speech path 6, the switching network 3 is so controlled by the central processing device 5 as to couple an upward signal channel from the output terminal 27a of the modem (CODEC) 26a to the input terminal 28b of the modem 26b via a downward signal channel. In addition, the terminal controller 29b for controlling the operation of the called subscriber's circuit 2b is informed by the central processing device 5 of the time slot numbers in the thus set speech path 6 of the highway.

Subsequently, the central processing device 5 instructs the terminal controller 29b to activate the transmission of ringing signal. The terminal controller 29b receiving this instruction ON-OFF controls the switch 22b for a predetermined ringing time at a predetermined ON-OFF period, so that a ringing signal from the continuous tone ringing signal source 21b is supplied to the telephone set 1b. Also, the terminal controller 29b tunes time slots for the upward signal from the CODEC 26b to the time slots in the speech path 6 and in addition time slots for the downward signal toward the CODEC 26b to the time slot numbers for the ring back tone source, and activates the operation of a loop back circuit provided in the CODEC 26b or renders the loop back circuit conductive. Under this condition, the signal generated from the ring back tone source 4 and applied to the input terminal 28b of the CODEC 26b is returned to the output terminal 27b in synchronism with the ON-OFF control of the switch 22b and transmitted on the time slots in the speech path 6.

The thus transmitted ring back tone is passed through speech path 6, input terminal 28a, CODEC 26a and hybrid circuit 23a in the order named to reach the telephone set 1a of the calling subscriber.

If the called subscriber B acknowledges, then the terminal controller 29b will deactivate the return function of the loop back circuit included in the called subscriber's circuit 2b, bringing the loop back circuit into a normal speech mode, and change the time slots for the downward signal to the time slots in the speech path 6. Under this condition, initiation of speech communication between the calling subscriber A and the called subscriber B is permitted.

This embodiment of the invention differs from a ring back tone system in a conventional digital and electronic switching system in that the subscriber's circuit has the loop back circuit for returning and transmitting the input signal from the highway to the speech path, that the ring back tone source 4 generates a continuous tone signal, that upon dialing the called subscriber, the speech path does not act as a reserved path but acts as a set path which is put into connection through the medium of the switching network 3, and that the return function of the loop back circuit is carried out in synchronism with the ON-OFF control of the switch for the ringing signal transmission and the ring back tone is transmitted to the calling subscriber via the loop back circuit and the speech path.

Figure 2:
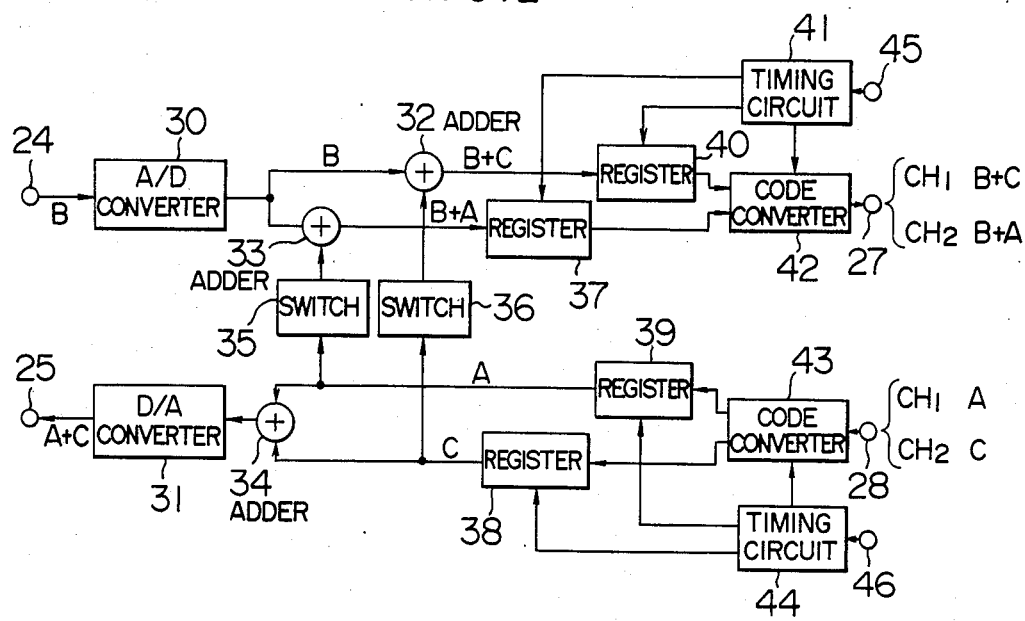
FIG. 2 is a schematic showing an embodiment of a CODEC having a loop back circuit used in the invention.

FIG. 2 schematically shows an embodiment of the loop back circuit included in the subscriber's circuit. In this embodiment, the loop back circuit in the subscriber's circuit comprises a PCM CODEC which mixes together PCM signals in a plurality of channels, whereby upon dialing a called subscriber, the continuous ring back tone is mixed in the upward channel of the speech path at a timing which is so controlled as to be synchronous with a timing for the transmission of the ringing signal.

Referring to FIG. 2, an analog voice signal B generated from the telephone set is supplied via a transmission terminal 24 to an A/D converter 30 and converted thereby into a linear PCM signal. The linear PCM signal B is added with linear PCM signals A and C from switch circuits 35 and 36 at adders 33 and 32, respectively. Resulting added PCM signals B+A and B+C are temporarily stored in registers 37 and 40, respectively. A timing signal for the coder generated from the terminal controller (not shown) is applied via an input terminal 45 to a timing circuit 41. The timing circuit 41 controls timings for a code converter 42 and the registers 37 and 40. At predetermined timings, the code converter 42 converts the signals from the registers 37 and 40 into compressed PCM signals which are sequentially transmitted to designated channels, that is, time slots in the highway via an output terminal 27. In this example, it is assumed that the signal B+C is shared to an upward signal channel No. 1 and the signal B+A to an upward signal channel No. 2. Applied to a downward signal input terminal 28 of the CODEC are the PCM signals A and C respectively shared to a downward signal channel No. 1 and a downward signal channel No. 2 in the highway. These compressed PCM signals are converted by a code converter 43 into linear PCM signals. A timing signal for the decoder generated from the terminal controller is applied via an input terminal 46 to a timing circuit 44 which controls timings for the code converter 43 and registers 38 and 39 in order to obtain the linear PCM signals C and A. These linear PCM signals A and C are added together at an adder 34 and processed by a D/A converter 31 to provide an analog signal representative of an added signal A+C on an output terminal 25. The signal A is supplied to the adder 33 via the switch circuit 35 and the signal C to the adder 32 via the switch circuit 36.

In this manner, the CODEC mixes together the PCM signals B, A and C shared to the plurality of channels.

The CODEC of FIG. 2 may be applied to the ring back tone transmission system shown in FIG. 1 as follows.

When the telephone set 1a goes off-hook, the processing device 5 executes a pre-processing prior to the transmission of the ringing signal in the conventional manner. Thereafter, the switching network 3 and the terminal controllers 29a and 29b are controlled to establish a speech path wherein, through the medium of the switching network 3, the continuous ring back tone source is coupled to the downward signal input terminal 28b of the CODEC 26b included in the called subscriber's circuit 2b through the downward signal channel No. 2 and at the same time the signal from the upward signal output terminal 27b of the CODEC 26b is applied to the input terminal 28a of the CODEC 26a included in the calling subscriber's circuit 2a through the downward signal channel No. 1, and the signal from the output terminal 27a of the CODEC 26a is coupled to the input terminal 28b of the CODEC 26b through the upward signal channel No. 1.

In this example, it is assumed that the terminal controller has been informed of the channel number (No. 2) (time slot numbers) for supplying the tone signal of the continuous ring back tone source 4 to the input terminal 28b of the CODEC 26b.

Subsequently, the processing device 5 instructs the terminal controller 29b to activate the transmission of ringing signal. The terminal controller 29b responsive to this instruction ON-OFF controls the switch 22b in accordance with a predetermined pattern of ringing signal, i.e., for a predetermined ringing time at a predetermined ON-OFF period, so that a ringing signal is supplied to the telephone set 1b and the switch 36 of the CODEC 26b is ON-OFF controlled in synchronism with the ON-OFF control of the switch 22b. The ringing signal source is of the generally known type. The output of the adder 32 is a mixture of the signal from the input terminal 28 through the downward signal channel No. 2 and the voice signal from the input terminal 24. But, because of the absence of the voice signal during dialing, the ring back tone exactly synchronous with the ringing signal is transmitted from the called subscriber's circuit to the calling subscriber's circuit.

Thereafter, upon acknowledgement by the called subscriber, the switches 36 and 22b are released and speech communication can be initiated immediately through the speech path 6 which has already been established.

Figure 3:
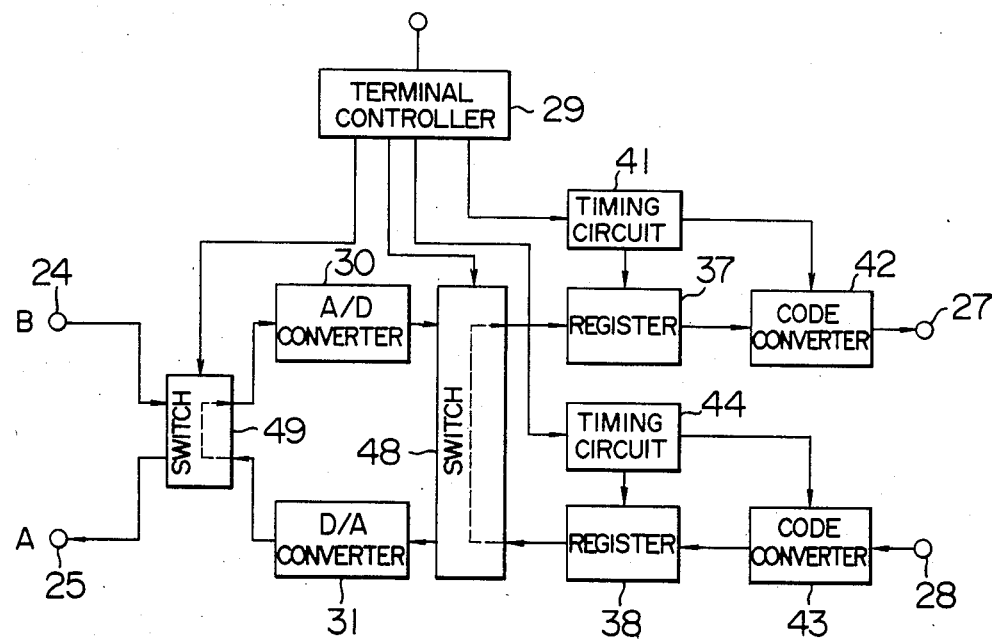
FIG. 3 is a similar diagram of another embodiment of the CODEC.

FIG. 3 schematically shows another embodiment of the CODEC having another type of loop back circuit for returning the PCM signals between the upward/downward channels. Identical components to those of FIG. 2 are designated by identical reference numerals and will not be detailed herein.

In the FIG. 2 embodiment, the loop back circuit has been realized by utilizing the CODEC having the function to mix the PCM signals in the plurality of channels. In the CODEC shown in FIG. 3, when the ringing signal from the ringing signal source 21b in FIG. 1 is transmitted to the called subscriber 1b by ON-OFF controlling the switch 22b, a connection of an input terminal of an A/D converter 30 with an output terminal of a D/A converter 31 is ON-OFF controlled by a switch 49 in synchronism with the ON-OFF control of the switch 22b or a connection between an input terminal of an upward signal register 37 and an output terminal of a downward signal register 38 is ON-OFF controlled by a switch 48 in synchronism with the ON-OFF control of the switch 22b, thereby establishing a return path. Control signals for these switches are fed from a terminal controller 29.

While, in the foregoing embodiments of the loop back circuit, the loop back circuit is provided in the CODEC, it may be provided in a portion of the subscriber's circuit other than the CODEC, for example, a portion for supply of speech current to the subscriber's circuit or a subscriber's interface circuit inclusive of the hybrid circuit in a manner similar to the analog loop back circuit shown in FIG. 3.

As described above, since according to the invention, the terminal controller provided for processing the called subscriber's circuit can perform simultaneous control of the ringing signal and the ring back tone independently of the phase of the ring back tone source, the synchronization of the ringing signal with the ring back tone can be accomplished economically, i.e., without increasing the hardware for distribution of timing signals for the ring back tone and decreasing the processing capability, thereby improving services to be rendered for the subscribers.

Further, upon acknowledgement by the called subscriber, only the switching network and the called subscriber's circuit can be controlled without necessity of controlling the calling subscriber's circuit. Therefore, the processing operation can be simplified and the processing capability can be improved efficiently.

Furthermore, the ON-OFF control can be effected for each unit of the called subscriber's circuit or for each unit of the terminal controller and hence peak power required for the ringing signal source and the switch drive source can be made uniform and their capacity can be reduced.

We claim:

1. A ring back tone transmission system for a digital switching apparatus, comprising:

a switching network;

a plurality of subscriber's circuits to be selectively connected to each other through said switching network, each subscriber's circuit having a loop back circuit for returning a signal received at the subscriber's circuit on a downward channel to an upward channel extending from the subscriber's circuit, a switch for transmitting a ringing signal to a called subscriber's telephone in accordance with a predetermined pattern, and a control circuit operative to ON-OFF control said loop back circuit to intermittently connect said downward channel to said upward channel in synchronism with the ON-OFF control of said switch and in accordance with the predetermined pattern;

a signal source of a ring back tone; and a central processing device operative, in response to a calling subscriber dialing a called subscriber, to establish in said switching network a speech path coupling the calling subscriber's circuit to the called subscriber's circuit and to establish said downward channel toward said called subscriber's circuit from said signal source of the ring back tone.

2. A ring back tone transmission system according to claim 1, wherein said signal source of the ring back tone comprises a signal source producing a continuous tone signal.

3. A ring back tone transmission system according to claim 1, wherein said loop back circuit operates to mix together a plurality of downward channel signals received from said switching network and said signal source of the ring back tone with an upward signal generated at the subscriber's circuit to provide a plurality of upward channel signals.

4. A ring back tone transmission system according to claim 1, wherein said loop back circuit is provided in a PCM coder-decoder included in the subscriber's circuit and connected to receive signals on a downward channel and supply signals to an upward channel.

5. A ring back tone transmission system according to claim 4, wherein said loop back circuit is provided between an input terminal of an A/D converter and an output terminal of a D/A converter provided in said PCM coder-decoder.

6. A ring back tone transmission system according to claim 4, wherein said loop back circuit is provided between an output terminal of an A/D converter and an input terminal of a D/A converter provided in said PCM coder-decoder.

7. A ring back tone transmission system for a digital switching apparatus comprising:

a switching network;

a plurality of subscriber's circuits to be selectively connected to each other through said switching network;

a signal source of a ring back tone; and a central processing device including means for controlling, in response to a speech request from a calling subscriber to a called subscriber, said switching network and the calling and called subscriber's circuits so that a speech path is established in said switching network and at least one upward channel is established from each of said calling and called subscriber's circuit to said switching network and at least one downward channel is established from said switching network to each of said calling and called subscriber's circuits;

wherein each of said subscriber's circuits includes a loop back circuit for returning a signal on the downward channel to the upward channel associated with a subscriber's circuit, a switch capable of selectively transferring a ringing signal to a telephone connected to the subscriber's circuit, and a control circuit capable of on-off controlling said switch and said loop back circuit so that the signal return by said loop back circuit and the selective signal transference by said switch are effected in synchronism with each other; and wherein said central processing device further includes means for establishing, in response to said speech requests, a path for coupling the downward channel associated with the called subscriber's circuit to said signal source of the ring back tone.

8. A ring back tone transmission system according to claim 7, wherein said signal source of the ring back tone comprises a signal source producing a continuous tone signal.

9. A ring back tone transmission system according to claim 7, wherein said loop back circuit in each of said subscriber's circuits includes means for mixing signals on a plurality of downward channels sent from other subscriber's circuits through said switching network, with a signal to be sent on one of the upward channels associated with a subscriber's circuit to said switching network to provide a plurality of upward channel signals.

10. A ring back tone transmission system according to claim 7, wherein each subscriber's circuit further includes a PCM coder-decoder having an A/D converter and a D/A converter for said upward and downward channels, respectively.

11. A ring back tone transmission system according to claim 10, wherein said loop back circuit in each of said subscriber's circuits includes first switch means provided between an input terminal of said A/D converter and an output terminal of said D/A converter of said PCM coder-decoder so that said signal return is effected by the on-off control of said first switch means by said control circuit in synchronism with the on-off control of said switch.

12. A ring back tone transmission system according to claim 10, wherein said loop back circuit in each subscriber's circuit includes second switch means provided between an output terminal of said A/D converter and an input terminal of said D/A converter of said PCM coder-decoder so that said signal return is effected by the on-off control of said second switch means by said control circuit in synchronism with the on-off control of said switch.

* * * * *